United States Patent [19]

Mayer

[11] Patent Number: 4,870,895

[45] Date of Patent: Oct. 3, 1989

[54] SYSTEM FOR VENTILATING THE INTERIOR OF A VEHICLE

[75] Inventor: Erhard Mayer, Holzkirchen, Fed. Rep. of Germany

[73] Assignee: Fraunhofer Gesellschaft zur Forderung, Munchen, Fed. Rep. of Germany

[21] Appl. No.: 300,064

[22] PCT Filed: Apr. 29, 1988

[86] PCT No.: PCT/DE88/00258

§ 371 Date: Dec. 29, 1988

§ 102(e) Date: Dec. 29, 1988

[87] PCT Pub. No.: WO88/08374

PCT Pub. Date: Nov. 3, 1988

[30] Foreign Application Priority Data

Apr. 29, 1987 [DE] Fed. Rep. of Germany ....... 3714223

[51] Int. Cl.$^4$ .............................................. B60H 1/26
[52] U.S. Cl. ......................................... 98/2; 98/2.15; 98/2.18; 98/2.19
[58] Field of Search ................... 98/2, 2.01, 2.03, 2.11, 98/2.15, 2.18, 2.19

[56] References Cited

U.S. PATENT DOCUMENTS

| | | | |
|---|---|---|---|
| 2,186,990 | 1/1940 | Pieri | 98/2.19 |
| 2,241,755 | 5/1941 | Zaccone | 98/2.18 X |
| 3,913,468 | 10/1975 | Krämer | 98/2.15 |
| 4,724,748 | 2/1988 | Geyer | 98/2.15 X |
| 4,741,256 | 5/1988 | Huang | 98/2.18 X |
| 4,807,523 | 2/1984 | Radtke et al. | 98/2.15 |

FOREIGN PATENT DOCUMENTS

| | | | |
|---|---|---|---|
| 3539063 | 5/1987 | Fed. Rep. of Germany | 98/2.15 |
| 3543125 | 8/1987 | Fed. Rep. of Germany | 98/2 |
| 856173 | 6/1940 | France | 98/2.15 |
| 57-508 | 5/1981 | Japan | 98/2.15 |
| 167819 | 10/1982 | Japan | 98/2 |
| 252019 | 12/1985 | Japan | 98/2.18 |
| 252020 | 12/1985 | Japan | 98/2.15 |

*Primary Examiner*—Harold Joyce
*Attorney, Agent, or Firm*—Barnes & Thornburg

[57] ABSTRACT

A system for ventilating the interior of a vehicle by introducing processed outside air (added air) via the roof of the vehicle via outlet openings in the roof of the vehicle which are individually allocated and generally congruent to seat surfaces and through which the added air issues directed in a vertical direction at the respective seat surface and wherein outlet openings are provided under the vehicle seats for expelling air from the vehicle interior.

20 Claims, 2 Drawing Sheets

SYSTEM FOR VENTILATING THE INTERIOR OF A VEHICLE

BACKGROUND AND SUMMARY OF THE INVENTION

The present invention relates to a system for ventilating the interior of a vehicle by introducing processed outside air into the interior of the vehicle via a roof of the vehicle.

In particular, the present invention is concerned with the problem of replenishing the air in the compartment of a vehicle.

The present invention is based on a system for ventilating the interior of a vehicle by introducing processed air (added air) from the outside via the roof of the vehicle. The state of the art is to introduce the added air via a duct disposed in the angle between the side walls and the floor of the vehicle, from where the air either contributes to forming a carpet of air flowing, by way of illustration, diagonally to the rear and diagonally against the floor (DE-AS 26 34 715), or is directed upward via branching ducts inside the vehicle walls to openings under the window (DE-AS 26 34 712).

In other known systems, the air inside the vehicle is exchanged with the air outside via air inlets or outlets by means of slits which are disposed above the side windows. These slits can be closed by means of flaps which can be regulated and operated by regulator or control devices (DE-AS 26 34 713).

A ventilation system is expected to distribute the air inside the compartment of a vehicle in such a manner that a draft-free state is achieved despite the confined space and that the air temperature decreases in upward direction.

Introducing air into the vehicle via its roof is, by way of illustration, known in connection with the specification requiring that cooled air may only be introduced via air distributors in the roof (DIN 1946, B1. 3, June 1962).

The object of the present invention is to provide a ventilation system for the interior of vehicles, which is especially suited to meet the aforementioned specifications.

In accordance with the present invention, a solution of the present invention is based on a system for ventilating the interior of a vehicle by introducing processed outside air into the interior of the vehicle via a roof of the vehicle, wherein outlet opening are located in the roof of the vehicle and are individually allocated to the seats of the vehicle and substantially congruent to their seat surfaces. An inlet air device is provided for directing outside air to the outlet openings, wherein the air is further directed in a vertical direction toward the respective seat surface. Used-air openings are provided under the vehicle seats for expelling air from the vehicle interior.

By means of the special invented arrangement of air outlet openings above the seats in the vehicle and the comparatively large surface of these openings, an air ventilation is achieved that does not convey to the occupant of the vehicle a sensation of draft.

A further advantage is obtained by having the roof of the vehicle formed as a two-shelled vehicle roof, having an outer heat-insulated shell and an inner shell of little heat capacity. The inner shell is provided with the outlet openings and the two shells define a hollow space which receives the outside air from the air inlet. Distributing elements are provided within the hollow space to distribute the outside air, vertically and individually forward of the vehicle seats in streams and with little turbulence.

It is also desirable to have an air treatment mechanism at a front part of the vehicle via means for adjusting the temperature of the outside air (cooling or heating), or intensifying its flow, or for filtering out impurities. The opening in the roof can have air directing guides for directing the outside air into the vehicle interior.

Another advantage of the invention resides in having the inlet air directed to the hollow space via front vehicle columns which enclose a vehicle windshield, and wherein the columns are constructed as airtight hollow bodies and/or directs at least a portion of the air to the hollow roof via a vehicle dashboard of double-shell construction or between panes of a vehicle windshield of multi-pane construction. In the latter case, at least one of the multi-panes can be opened for cleaning by means of a hinge.

It is additionally advantageous if the hollow roof has chambers which overlap and separate the outlet openings from one another, and wherein distributing means are provided with throttle elements for the individual openings to regulate the streams of air therefrom. These distributing and guiding means are provided for calming the air streams so that there is little turbulence from the outlets into the interior of the vehicle. These guiding and distributing means can include filters designed as flow rectifiers or coverings of the outlets and should be able to be operated individually from the vehicle seats.

It is advantageous if the controls are either operated manually or react to the temperature of an enclosing surface of the interior, and/or to a temperature or vehicle humidity of the outside, and/or the compartment air, so as to provide a control system which measures human comfort.

Another feature of the invention has the used-air outlets in the vehicle connected to a hollow floor of the vehicle which passes into a duct located at the rear of the vehicle and through which the expelled air is directed in a direction opposite to a direction of vehicle travel by means of underpressure of air flowing by the vecicle during travel.

Other objects, advantages and novel features of the present invention will become apparent from the following detailed description of the invention when considered in conjunction with the accompanying drawings.

DETAILED DESCRIPTION OF THE DRAWINGS

Figure 1:
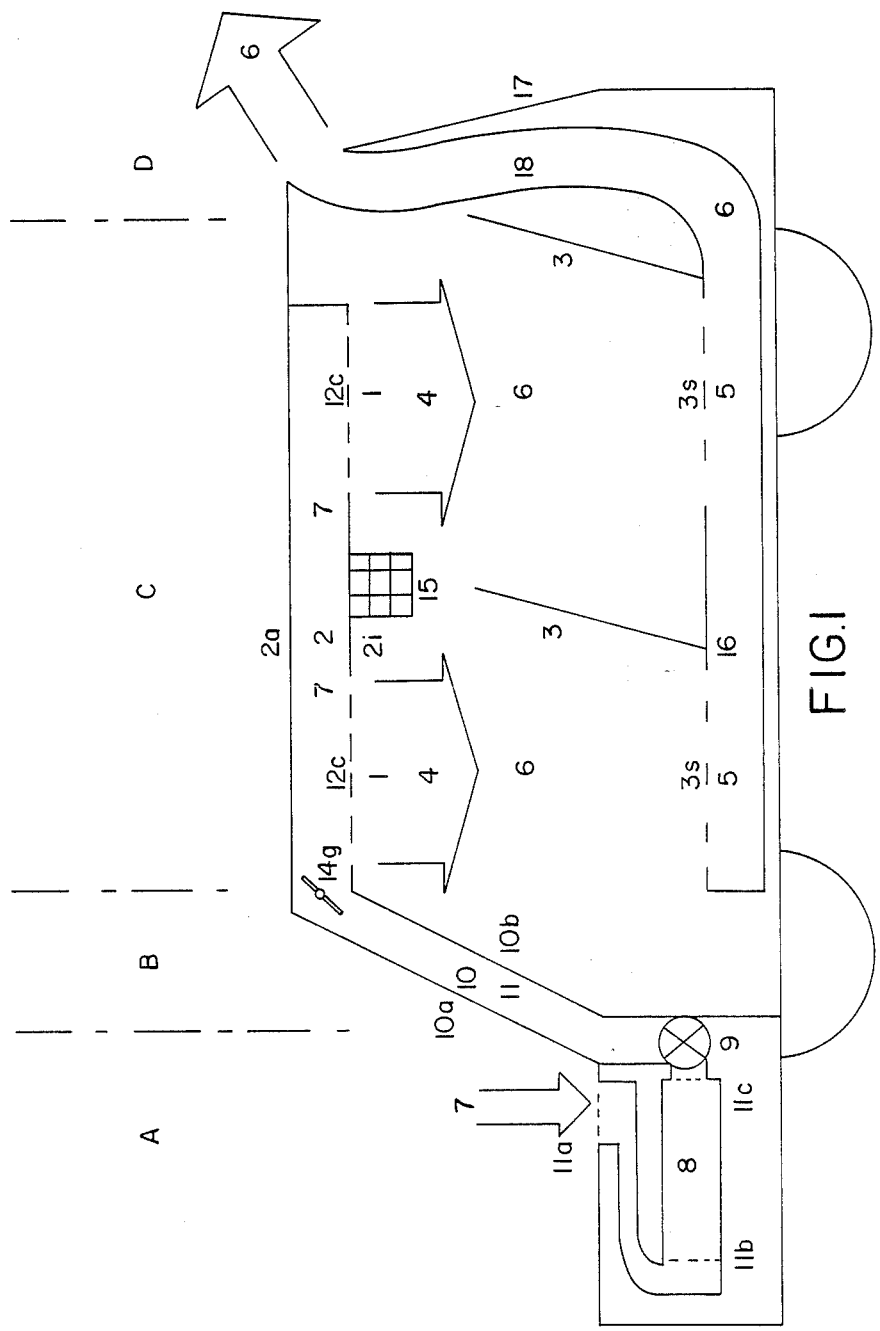
FIG. 1 schematically shows a combination of longitudinal sections of a passenger motor car having a system in accordance with the present invention.

FIG. 1 shows a longitudinal section of a diagrammatically illustrated passenger car which is divided into four fields or areas A to D.

The longitudinal sections A to D illustrated in FIG. 1 do not necessarily have to lie in one plane; they are combined in the drawing plane of FIG. 1 just to simplify depiction.

Field A contains a longitudinal section of the front area of the motor vehicle, usually including the propulsion system (not shown) of the motor vehicle under a covering (hood). In area A, there is a fresh air inlet with a filter 11a, preferably a dust filter, for the outside air 7.

In this figure, this inlet is assumed to be located at the top, but it may just as easily be situated at some other site of the covering or in the front part of the vehicle.

The air inlet leads, via a duct and another filter 11b to a device 8, by means of which the inducted outside air may be selectively heated or cooled as required using conventional means. Device 8, which may also have a different position than the one shown in the figure, particularly relative to the travel direction of the vehicle. The device 8 terminates with another filter 11c, adjacent to which is, if necessary, a pressure source 9, preferably a blower to compress or to intensify the force of the flow of the inducted outside air 7 processed by means of filters 11a–c and device 8.

In field B of FIG. 1, the air reaches the hollow roof formed by shells 2a and 2i in field C of FIG. 1 from pressure source 9 via a hollow body, not depicted in detail, formed as a passage by airtightly joining the two shells of a double-shelled dashboard and via an adjacent duct 10 or 11. Duct 10 is formed by the two panes 10a and 10b of an airtight double-paned windshield 10, and duct 11 is formed by columns 11 of the vehicle constructed as airtight bodies surrounding windshield 10, which in this case is single-paned, as is usual.

The invented manner of directing air between pressure source 9 and the hollow roof 2 is distinguished by the inducted outside air 7 being able to effectively cool the double-shelled dashboard through which it passes, particularly its upper terminal section which, as experience has shown, can become very hot from the sun shining on it.

If air is directed between panes 10a and 10b of the double-paned windshield 10, it is also possible to defrost the double-paned windshield, or clear it of condensation, in a simple manner in conjunction with the temperature control possibilities of device 8. In this case, it is advantageous to make provisions to be able to easily open one of the two panes, preferably inner pane 10b, preferably raising or tipping it by means of hinges, in order to be able to easily clean the space between the panes when necessary.

Hollow roof 2 forms a closed chamber and acts like a collector for processed outside air 7 directed to it. Outer shell 2a of hollow roof 2 is heat-insulated in order to prevent processed air 7 from being heated or losing heat to the surrounding area. In contrast, inner shell 2i is composed of a material with little heat capacity, which does not lastingly change the heat content of the processed air 7.

Fitted in inner roof shell 2i are large surface outlet openings 1, the number and size of which depends on having vehicle seats 3 below them. The form of the openings is essentially congruent to the seat surfaces 3s of seats 3.

The outlet openings 1 are separated from one another by chambers 13 (FIG. 2), which overlap them and extend to the outer shell 2a. Chambers 13 are within the double-shelled vehicle roof 2, to which processed outside air 7 can only gain access via air inlets, whose effective cross section is regulated by means of throttle elements 14. These throttle elements are adjusted to the individual needs of the passengers from the corresponding vehicle seat 3 by means of mechanically operated setting elements, such as Bowden cables, or by means of electric setting motors (not shown). A basic setting, which comes in question particularly in the case of introducing heated air, can be set by the driver of the vehicle by means of operating the throttle elements in the access to hollow roof 2, such as, by way of illustration, throttle flap 14g.

The large surface outlet openings 1 are provided with air direction and soothing guides 12b and 12c, which cause streams of added air 4 to form, having little turbulence and thereby draft-free and directed vertically at vehicle seat 3. For this purpose, fine-meshed fabric, such as, by way of illustration, polyester 120 HD or metal fabric 10340158 (high-grade steel), which is less insensitive to mechanical stress, can be used.

These fabrics, like the inner roof shell 2i, have a low heat capacity. On the whole, the surface temperature of the inner roof shell 2i is made in this manner to practically adjust to the value of the relative low temperature of the added air 7 or decrease the surface temperature above the heads of the occupants of the vehicle, thereby ensuring the aspired upward reduction of the air temperature in the compartment.

The gathering compartment air 6 is collected as used air, via used-air openings 5 in hollow space 16 of the vehicle. In field D of FIG. 1, the used-air openings 5 are connected to a used-air duct 18, the construction and design of which depends on the given possibilities of the vehicle. Duct 18 leads to an edge of the rear of the vehicle 17, preferably where an underpressure develops during travelling due to the airstream, which effectively supports the expulsion of used air 6.

It is especially advantageous to have throttle elements 14 and 14g operated by means of a control device 15, which reacts to the temperature of the enclosing surfaces of the compartment of the vehicle, the temperature and the humidity of added air 4, or compartment air 6, or to one or several of these parameters.

In accordance with the present invention, it is particularly advantageous to employ as a control device of this type, the apparatus for measuring comfort described in German Patent Application No. P 32 05 704.0-52, and in particular, the version having four measuring surfaces facing the front, the rear, the left, and the right. These measuring surfaces give a simulative "skin temperature" at a prescribed heating capacity. Each occupant of the vehicle can set the level of this "skin temperature" from his seat, whereby a microprocessor integrates the registered individual levels from the four measuring surfaces. In the case of a difference between the desired level and the actual level, the throttle elements 14 are reset by the electric motors controlled by the microprocessor, thereby changing the respective air volume streams 4.

Another possible way to adjust the temperature of the streams of added air is by introducing streams of coolant, which can be regulated, to chambers 13.

The present invention has been described in the aforegoing using a preferred embodiment without the intention of limiting the scope of the overall inventive idea as it can be drawn from the claims hereto. In particular, the present invention is not restricted to use in passenger cars, but rather can be employed in any air, water or land vehicle.

Although the present invention has been described and illustrated in detail, it is to be clearly understood

SYSTEM FOR VENTILATING THE INTERIOR OF A VEHICLE

BACKGROUND AND SUMMARY OF THE INVENTION

The present invention relates to a system for ventilating the interior of a vehicle by introducing processed outside air into the interior of the vehicle via a roof of the vehicle.

In particular, the present invention is concerned with the problem of replenishing the air in the compartment of a vehicle.

The present invention is based on a system for ventilating the interior of a vehicle by introducing processed air (added air) from the outside via the roof of the vehicle. The state of the art is to introduce the added air via a duct disposed in the angle between the side walls and the floor of the vehicle, from where the air either contributes to forming a carpet of air flowing, by way of illustration, diagonally to the rear and diagonally against the floor (DE-AS 26 34 715), or is directed upward via branching ducts inside the vehicle walls to openings under the window (DE-AS 26 34 712).

In other known systems, the air inside the vehicle is exchanged with the air outside via air inlets or outlets by means of slits which are disposed above the side windows. These slits can be closed by means of flaps which can be regulated and operated by regulator or control devices (DE-AS 26 34 713).

A ventilation system is expected to distribute the air inside the compartment of a vehicle in such a manner that a draft-free state is achieved despite the confined space and that the air temperature decreases in upward direction.

Introducing air into the vehicle via its roof is, by way of illustration, known in connection with the specification requiring that cooled air may only be introduced via air distributors in the roof (DIN 1946, Bl. 3, June 1962).

The object of the present invention is to provide a ventilation system for the interior of vehicles, which is especially suited to meet the aforementioned specifications.

In accordance with the present invention, a solution of the present invention is based on a system for ventilating the interior of a vehicle by introducing processed outside air into the interior of the vehicle via a roof of the vehicle, wherein outlet opening are located in the roof of the vehicle and are individually allocated to the seats of the vehicle and substantially congruent to their seat surfaces. An inlet air device is provided for directing outside air to the outlet openings, wherein the air is further directed in a vertical direction toward the respective seat surface. Used-air openings are provided under the vehicle seats for expelling air from the vehicle interior.

By means of the special invented arrangement of air outlet openings above the seats in the vehicle and the comparatively large surface of these openings, an air ventilation is achieved that does not convey to the occupant of the vehicle a sensation of draft.

A further advantage is obtained by having the roof of the vehicle formed as a two-shelled vehicle roof, having an outer heat-insulated shell and an inner shell of little heat capacity. The inner shell is provided with the outlet openings and the two shells define a hollow space which receives the outside air from the air inlet. Distributing elements are provided within the hollow space to distribute the outside air, vertically and individually forward of the vehicle seats in streams and with little turbulence.

It is also desirable to have an air treatment mechanism at a front part of the vehicle via means for adjusting the temperature of the outside air (cooling or heating), or intensifying its flow, or for filtering out impurities. The opening in the roof can have air directing guides for directing the outside air into the vehicle interior.

Another advantage of the invention resides in having the inlet air directed to the hollow space via front vehicle columns which enclose a vehicle windshield, and wherein the columns are constructed as airtight hollow bodies and/or directs at least a portion of the air to the hollow roof via a vehicle dashboard of double-shell construction or between panes of a vehicle windshield of multi-pane construction. In the latter case, at least one of the multi-panes can be opened for cleaning by means of a hinge.

It is additionally advantageous if the hollow roof has chambers which overlap and separate the outlet openings from one another, and wherein distributing means are provided with throttle elements for the individual openings to regulate the streams of air therefrom. These distributing and guiding means are provided for calming the air streams so that there is little turbulence from the outlets into the interior of the vehicle. These guiding and distributing means can include filters designed as flow rectifiers or coverings of the outlets and should be able to be operated individually from the vehicle seats.

It is advantageous if the controls are either operated manually or react to the temperature of an enclosing surface of the interior, and/or to a temperature or vehicle humidity of the outside, and/or the compartment air, so as to provide a control system which measures human comfort.

Another feature of the invention has the used-air outlets in the vehicle connected to a hollow floor of the vehicle which passes into a duct located at the rear of the vehicle and through which the expelled air is directed in a direction opposite to a direction of vehicle travel by means of underpressure of air flowing by the vecicle during travel.

Other objects, advantages and novel features of the present invention will become apparent from the following detailed description of the invention when considered in conjunction with the accompanying drawings.

BRIEF DESCRIPTION OF THE DRAWINGS

Figure 2:
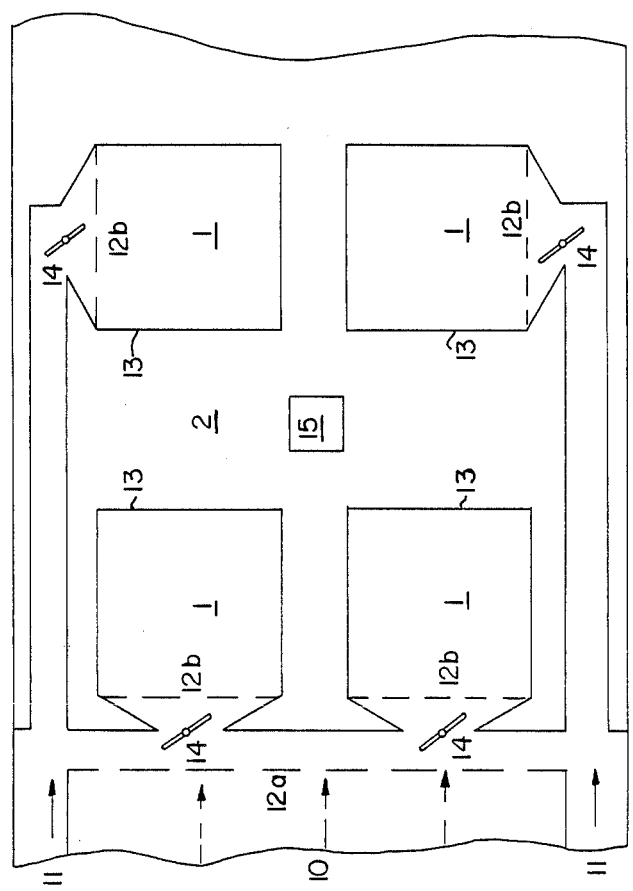
FIG. 2 schematically shows a top view of the interior shell of a two-shelled hollow roof of the vehicle and with the outlet openings for added air.

FIG. 1 schematically shows a combination of longitudinal sections of a passenger motor car having a system in accordance with the present invention; and FIG. 2 schematically shows a top view of the interior shell of a two-shelled hollow roof of the vehicle and with the outlet openings for added air.

DETAILED DESCRIPTION OF THE DRAWINGS

FIG. 1 shows a longitudinal section of a diagrammatically illustrated passenger car which is divided into four fields or areas A to D.

The longitudinal sections A to D illustrated in FIG. 1 do not necessarily have to lie in one plane; they are combined in the drawing plane of FIG. 1 just to simplify depiction.

Field A contains a longitudinal section of the front area of the motor vehicle, usually including the propulsion system (not shown) of the motor vehicle under a covering (hood). In area A, there is a fresh air inlet with a filter 11a, preferably a dust filter, for the outside air 7.

In this figure, this inlet is assumed to be located at the top, but it may just as easily be situated at some other site of the covering or in the front part of the vehicle.

The air inlet leads, via a duct and another filter 11b to a device 8, by means of which the inducted outside air may be selectively heated or cooled as required using conventional means. Device 8, which may also have a different position than the one shown in the figure, particularly relative to the travel direction of the vehicle. The device 8 terminates with another filter 11c, adjacent to which is, if necessary, a pressure source 9, preferably a blower to compress or to intensify the force of the flow of the inducted outside air 7 processed by means of filters 11a–c and device 8.

In field B of FIG. 1, the air reaches the hollow roof formed by shells 2a and 2i in field C of FIG. 1 from pressure source 9 via a hollow body, not depicted in detail, formed as a passage by airtightly joining the two shells of a double-shelled dashboard and via an adjacent duct 10 or 11. Duct 10 is formed by the two panes 10a and 10b of an airtight double-paned windshield 10, and duct 11 is formed by columns 11 of the vehicle constructed as airtight bodies surrounding windshield 10, which in this case is single-paned, as is usual.

The invented manner of directing air between pressure source 9 and the hollow roof 2 is distinguished by the inducted outside air 7 being able to effectively cool the double-shelled dashboard through which it passes, particularly its upper terminal section which, as experience has shown, can become very hot from the sun shining on it.

If air is directed between panes 10a and 10b of the double-paned windshield 10, it is also possible to defrost the double-paned windshield, or clear it of condensation, in a simple manner in conjunction with the temperature control possibilities of device 8. In this case, it is advantageous to make provisions to be able to easily open one of the two panes, preferably inner pane 10b, preferably raising or tipping it by means of hinges, in order to be able to easily clean the space between the panes when necessary.

Hollow roof 2 forms a closed chamber and acts like a collector for processed outside air 7 directed to it. Outer shell 2a of hollow roof 2 is heat-insulated in order to prevent processed air 7 from being heated or losing heat to the surrounding area. In contrast, inner shell 2i is composed of a material with little heat capacity, which does not lastingly change the heat content of the processed air 7.

Fitted in inner roof shell 2i are large surface outlet openings 1, the number and size of which depends on having vehicle seats 3 below them. The form of the openings is essentially congruent to the seat surfaces 3s of seats 3.

The outlet openings 1 are separated from one another by chambers 13 (FIG. 2), which overlap them and extend to the outer shell 2a. Chambers 13 are within the double-shelled vehicle roof 2, to which processed outside air 7 can only gain access via air inlets, whose effective cross section is regulated by means of throttle elements 14. These throttle elements are adjusted to the individual needs of the passengers from the corresponding vehicle seat 3 by means of mechanically operated setting elements, such as Bowden cables, or by means of electric setting motors (not shown). A basic setting, which comes in question particularly in the case of introducing heated air, can be set by the driver of the vehicle by means of operating the throttle elements in the access to hollow roof 2, such as, by way of illustration, throttle flap 14g.

The large surface outlet openings 1 are provided with air direction and soothing guides 12b and 12c, which cause streams of added air 4 to form, having little turbulence and thereby draft-free and directed vertically at vehicle seat 3. For this purpose, fine-meshed fabric, such as, by way of illustration, polyester 120 HD or metal fabric 10340158 (high-grade steel), which is less insensitive to mechanical stress, can be used.

These fabrics, like the inner roof shell 2i, have a low heat capacity. On the whole, the surface temperature of the inner roof shell 2i is made in this manner to practically adjust to the value of the relative low temperature of the added air 7 or decrease the surface temperature above the heads of the occupants of the vehicle, thereby ensuring the aspired upward reduction of the air temperature in the compartment.

The gathering compartment air 6 is collected as used air, via used-air openings 5 in hollow space 16 of the vehicle. In field D of FIG. 1, the used-air openings 5 are connected to a used-air duct 18, the construction and design of which depends on the given possibilities of the vehicle. Duct 18 leads to an edge of the rear of the vehicle 17, preferably where an underpressure develops during travelling due to the airstream, which effectively supports the expulsion of used air 6.

It is especially advantageous to have throttle elements 14 and 14g operated by means of a control device 15, which reacts to the temperature of the enclosing surfaces of the compartment of the vehicle, the temperature and the humidity of added air 4, or compartment air 6, or to one or several of these parameters.

In accordance with the present invention, it is particularly advantageous to employ as a control device of this type, the apparatus for measuring comfort described in German Patent Application No. P 32 05 704.0-52, and in particular, the version having four measuring surfaces facing the front, the rear, the left, and the right. These measuring surfaces give a simulative "skin temperature" at a prescribed heating capacity. Each occupant of the vehicle can set the level of this "skin temperature" from his seat, whereby a microprocessor integrates the registered individual levels from the four measuring surfaces. In the case of a difference between the desired level and the actual level, the throttle elements 14 are reset by the electric motors controlled by the microprocessor, thereby changing the respective air volume streams 4.

Another possible way to adjust the temperature of the streams of added air is by introducing streams of coolant, which can be regulated, to chambers 13.

The present invention has been described in the aforegoing using a preferred embodiment without the intention of limiting the scope of the overall inventive idea as it can be drawn from the claims hereto. In particular, the present invention is not restricted to use in passenger cars, but rather can be employed in any air, water or land vehicle.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A system for ventilating the interior of a vehicle by introducing processed outside air into the interior of the vehicle via a roof of the vehicle, wherein outlet opening means are located in the roof of the vehicle and are individually allocated to the seats of the vehicle and substantially congruent to their seat surfaces; inlet air means for directing said outside air to said outlet opening means; said outlet opening means directing said outlet air in a vertical direction toward the respective seat surface; and wherein used-air openings are provided under the vehicle seats for expelling air from the vehicle interior.

2. A system according to claim 1, wherein the roof of the vehicle is formed as a two-shelled vehicle roof, having an outer heat-insulated shell and an inner shell of little heat capacity; said inner shell being provided with said outlet opening means; said two shells defining a hollow space which receives the outside air from said inlet air means; and distributing means within said hollow space to distribute the outside air directed vertically and individually at said vehicle seats in streams and with little turbulence.

3. A system according to claim 1, wherein said inlet means for said outside air directs said air from a front part of the vehicle via means for adjusting at least one of the temperature of said outside air or intensifying its flow to the outlet opening means.

4. A system according to claim 3, wherein said outlet opening means have air directing guides for directing the outside air into the vehicle interior.

5. A system according to claim 2, wherein said inlet air means directs said outside air to said hollow space via front vehicle columns enclosing a vehicle windshield and wherein said columns are constructed as airtight hollow bodies.

6. A system according to claim 2, wherein said inlet air means directs at least a portion of said outlet air to said hollow roof via at least one of a vehicle dashboard of double-shell construction or between panes of a vehicle windshield of multi-pane construction.

7. A system according to claim 6, wherein at least one of said multi-panes can be opened for cleaning.

8. A system according to claim 7, wherein at least one of said multi-panes is opened utilizing hinge means.

9. A system according to claim 1, wherein said inlet air means includes process means to treat said outside air directed to said roof.

10. A system according to claim 9, wherein said process means includes at least one of a heating, cooling or filter means for the outside air.

11. A system according to claim 2, wherein chamber means are inset in said hollow roof and which overlap and separate said outlet opening means from one another; said distributing means being provided with throttle elements for the individual opening means to regulate said streams.

12. A system according to claim 2, wherein guiding means are provided for calming said distributed air streams of little turbulence, from said outlet opening to said interior.

13. A system according to claim 12, wherein said guiding means are filters designed as at least one of flow rectifiers, or of coverings of said outlet openings.

14. A system according to claim 11, wherein said throttle elements are able to be operated individually from said vehicle seats.

15. A system according to claim 1, wherein control devices are provided to operated said inlet air means, which react to at least one of a temperature of an enclosing surfaces of the interior or to a temperature or vehicle humidity of said outside or said compartment air.

16. A system according to claim 15, wherein said control device is an apparatus for measuring human comfort.

17. A system according to claim 1, wherein said used-air opening means are connected to a hollow floor of the vehicle which passes into a duct located at the rear of the vehicle and through which said expelled air is directed in a direction opposite to a direction of vehicle travel by means of underpressure built up during travel.

18. A system according to claim 2, wherein said used-air opening means are connected to a hollow floor of the vehicle which passes into a duct located at the rear of the vehicle and through which said expelled air is directed in a direction opposite to a direction of vehicle travel by means of underpressure built up during travel.

19. A system according to claim 5, wherein said used-air opening means are connected to a hollow floor of the vehicle which passes into a duct located at the rear of the vehicle and through which said expelled air is directed in a direction opposite to a direction of vehicle travel by means of underpressure built up during travel.

20. A system according to claim 11, wherein said used-air opening means are connected to a hollow floor of the vehicle which passes into a duct located at the rear of the vehicle and through which said expelled air is directed in a direction opposite to a direction of vehicle travel by means of underpressure built up during travel.

* * * * *